UNITED STATES PATENT OFFICE.

HENRY C. McMILLIN, OF MARIETTA, OHIO.

PLASTERING COMPOSITION.

SPECIFICATION forming part of Letters Patent No. 660,453, dated October 23, 1900.

Application filed July 11, 1900. Serial No. 23,270. (No specimens.)

*To all whom it may concern:*

Be it known that I, HENRY C. MCMILLIN, a citizen of the United States, residing at Marietta, county of Washington, and State of Ohio, have invented a new and useful composition of matter to be used as a hard plaster for brown-plastering walls of buildings, of which the following is a specification.

My composition consists of the following ingredients combined in the proportions stated, viz: calcined plaster, seventy pounds; vulcanite cement, thirty pounds; sharp clean sand, two hundred and twenty pounds; powdered acid phosphate, four ounces; powdered glue, four ounces; hair, one-half pound; water, eighteen gallons.

In combining the above-specified ingredients I first thoroughly mix in the dry state, by means of suitable machinery, the calcined plaster, vulcanite cement, sand, acid phosphate of calcium, glue, and hair. I then add water, this being suitably accomplished by placing the above dry composition in one end of a mixing-box and a sufficient quantity of water in the opposite end of the box to reduce the above dry mixture to the proper consistency to spread evenly with a trowel. I then by the use of a common hoe, such as is used by plasterers, thoroughly mix the dry composition with the water, reducing the combined mixture to a consistency to spread nicely with a trowel. This will provide sufficient plaster for fifteen yards, two coats, and may be applied in the usual manner to lath, brick, or stone walls and finished to a smooth surface, which will be superior, not of itself disposed to crack or buckle-lath, is waterproof, and will grow hard with age.

While the proportion of water is specified, as a rule, this quantity may be varied slightly, as circumstances may require, as it is obvious that a proper consistency is necessary for properly applying the plaster to various kinds of walls.

I am aware that most of the ingredients have been used in different ways for the purpose for which this composition is designed, but that no composition of the ingredients and in the proportions as I herein describe has been used.

What I claim, and desire to secure by Letters Patent, is—

A composition of matter to be used to form a coating on walls, consisting of calcined plaster, vulcanite cement, sand, powdered glue, acid phosphate, hair and water, and combined in the proportions and manner substantially as hereinbefore specified.

HENRY C. McMILLIN.

Witnesses:
N. E. KIDD,
DAVID H. THOMAS.